(12) United States Patent
Petrell et al.

(10) Patent No.: US 12,634,424 B1
(45) Date of Patent: **\*May 19, 2026**

(54) ADAPTIVE VISIBILITY ENHANCEMENT IN TRANSPARENT AUGMENTED REALITY DISPLAYS

(71) Applicant: Distance Technologies Oy, Helsinki (FI)

(72) Inventors: Joona Petrell, Tampere (FI); Mikko Strandborg, Hangonkylä (FI)

(73) Assignee: Distance Technologies Oy, Helsinki (FI)

( \* ) Notice: Subject to any disclaimer, the term of this patent is extended or adjusted under 35 U.S.C. 154(b) by 0 days.

This patent is subject to a terminal disclaimer.

(21) Appl. No.: 19/259,095

(22) Filed: Jul. 3, 2025

Related U.S. Application Data

(63) Continuation-in-part of application No. 19/212,995, filed on May 20, 2025, now Pat. No. 12,482,203.

(51) Int. Cl.
| | |
|---|---|
| *G06T 19/00* | (2011.01) |
| *G02B 27/01* | (2006.01) |
| *G02B 27/14* | (2006.01) |
| *H04N 13/117* | (2018.01) |
| *H04N 13/128* | (2018.01) |
| *H04N 13/133* | (2018.01) |

(Continued)

(52) U.S. Cl.
CPC ......... *H04N 13/15* (2018.05); *G02B 27/0179* (2013.01); *G02B 27/14* (2013.01); *G06T 19/006* (2013.01); *H04N 13/117* (2018.05); *H04N 13/128* (2018.05); *H04N 13/133* (2018.05); *H04N 13/344* (2018.05); *H04N 13/383* (2018.05); *G02B 27/0093* (2013.01);

*G02B 2027/0118* (2013.01); *G02B 2027/0138* (2013.01); *G02B 2027/0141* (2013.01); *G02B 27/0172* (2013.01); *G02B 2027/0187* (2013.01)

(58) Field of Classification Search
None
See application file for complete search history.

(56) References Cited

U.S. PATENT DOCUMENTS

2021/0208400 A1 \* 7/2021 Hong ................... G02B 27/283

OTHER PUBLICATIONS

Hong et al., "See-through optical combiner for augmented reality head-mounted display: index-matched anisotropic crystal lens" 2017. (Year: 2017).\*

\* cited by examiner

*Primary Examiner* — Nicholas R Wilson
(74) *Attorney, Agent, or Firm* — Ziegler IP Law Group, LLC.

(57) ABSTRACT

An augmented reality system includes a tracker, a transparent display arranged on an optical path of a real-world light field from a real-world environment, at least one real-world facing camera, and at least one processor. The processor is configured to determine a relative position of each eye of at least one user with respect to the transparent display using the tracker, generate or retrieve an image to be displayed based on the determined positions, and determine a corresponding portion of the transparent display from which light rays of a given graphical element are to be directed toward a given eye. The processor is further configured to capture at least one real-world image, determine a colour and luminance of a portion of the real-world light field, calculate colour and luminance differences, adjust at least one graphical parameter based on the differences, and display the image via the transparent display.

15 Claims, 4 Drawing Sheets

(51) Int. Cl.

| | |
|---|---|
| *H04N 13/15* | (2018.01) |
| *H04N 13/344* | (2018.01) |
| *H04N 13/383* | (2018.01) |
| *G02B 27/00* | (2006.01) |

400

1

ADAPTIVE VISIBILITY ENHANCEMENT IN TRANSPARENT AUGMENTED REALITY DISPLAYS

CROSS-REFERENCE TO RELATED APPLICATIONS

This application is a continuation-in-part of U.S. patent application Ser. No. 19/212,995, titled "ADAPTIVE VISIBILITY ENHANCEMENT IN AUGMENTED REALITY" and filed on May 20, 2025, which is incorporated herein by reference.

TECHNICAL FIELD

The present disclosure relates to systems for adaptive visibility enhancement in transparent augmented-reality displays. The present disclosure also relates to methods for adaptive visibility enhancement in transparent augmented-reality displays.

BACKGROUND

Augmented-reality displays are used in wearable devices, vehicular interfaces, and transparent display panels to present graphical content overlaid on a real-world environment while allowing light from the real-world environment to pass through an image plane of the augmented-reality display. The graphical content may include user interface elements, visual indicators, or contextual overlays that are positioned with respect to a viewpoint of at least one viewer. In automotive and head-mounted implementations, the augmented-reality display is often configured to present dynamically updated graphical content in response to a motion of the viewer or a change in the surrounding real-world environment. The graphical content is perceived as being part of the real-world environment behind the transparent display, enabling a combined interpretation of synthetic and real-world information.

In conventional augmented-reality displays, the graphical content is frequently rendered without evaluating a visual complexity of a real-world background that lies behind a transparent portion of a display surface of the augmented-reality display. A graphical element may appear over a region of high luminance or visual clutter in the real-world environment, reducing a contrast between the graphical element and the real-world background. Such reductions in the contrast or visibility are further compounded when the real-world background includes colours that closely resemble the colour of the graphical element. The augmented-reality display in such systems lacks any mechanism for detecting colour proximity or brightness similarity between the real-world background and the graphical content, resulting in a diminished visibility of displayed information.

Furthermore, in conventional augmented-reality displays, viewers with visual impairments such as red-green colour vision deficiency, reduced luminance sensitivity, or myopic perception may experience persistent difficulty in interpreting overlaid graphical content. In an absence of content-specific adjustments that respond to perceptual characteristics of an individual viewer or environmental lighting conditions, graphical content may remain either illegible or poorly distinguishable. Conventional accessibility settings, such as user-selectable options for enlarging text size, enabling high-contrast display modes, applying colour filters for colour vision deficiencies, or converting graphical content into simplified monochrome representations and the like are generally static and manually configurable. The accessibility settings are typically applied uniformly across all graphical content, without taking into account a placement of the graphical content on the image plane or a spatial context of the real-world background, resulting in persistent visibility challenges for viewers with visual impairments or in visually demanding environments.

Therefore, a need exists for augmented-reality display systems that can improve a perceptual clarity of the graphical content rendered over transparent image planes under varying lighting and environmental conditions. Systems are required that can respond to inconsistencies in background complexity, viewer-specific differences in viewpoint and perception, and uncontrolled degradation of contrast or visibility, thereby enabling more stable and interpretable rendering of graphical content through transparent augmented-reality displays.

SUMMARY

The present disclosure seeks to provide a system for adaptive visibility enhancement in transparent augmented-reality displays. The system comprises a transparent display arranged on an optical path of a real-world light field, at least one real-world facing camera, a tracker, and at least one processor configured to determine a relative position of each eye of a user, calculate a colour and luminance difference between a graphical element and a corresponding portion of the real-world light field, and adjust at least one display parameter of the graphical element based on the calculated differences. The present disclosure also seeks to provide a method for adaptive visibility enhancement in transparent augmented-reality displays. The method comprises determining a relative position of each eye of a user with respect to a transparent display, capturing at least one real-world image, calculating a colour and luminance difference for a graphical element based on a real-world light field visible to a given eye, and adjusting at least one graphical parameter based on the calculated differences. The aim of the present disclosure is achieved by the system and the method as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

and

Figure 4:
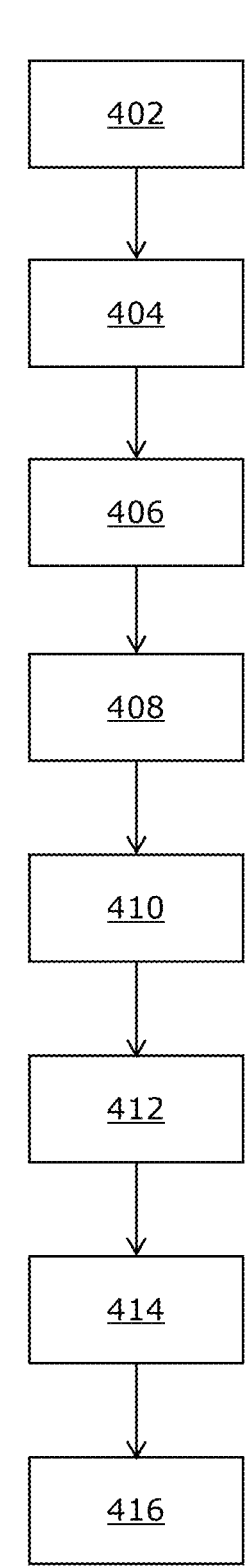

FIG. 4 shows steps of a method, in accordance with an embodiment of the present disclosure.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an augmented reality system comprising:

a tracker;

a transparent display arranged on an optical path of a real-world light field from a real-world environment;

at least one real-world facing camera; and at least one processor configured to:

determine a relative position of each eye of at least one user with respect to the transparent display, using the tracker;

generate or retrieve an image to be displayed, based on the relative position of each eye of the at least one user with respect to the transparent display;

for a given region of the image that represents a graphical element, determine a corresponding portion of the transparent display from which light rays of the given region of the image are to be directed toward a given eye of the at least one user during display of the image, based on a relative position of the given eye with respect to the transparent display, and a position of the given region in the image;

capture at least one real-world image of the real-world environment using the at least one real-world facing camera;

determine a colour and luminance of a portion of the real-world light field that passes through the corresponding portion of the transparent display toward the given eye, based on the at least one real-world image and the relative position of the given eye with respect to the transparent display;

calculate a colour difference and a luminance difference for the given eye between the colour and luminance of said portion of the real-world light field and a colour and luminance of the graphical element;

adjust at least one of: the colour, the luminance, a size, at least one iconographic parameter of the graphical element in the given region of the image, based on the colour difference and the luminance difference for the given eye; and display the image via the transparent display for producing a synthetic light field, wherein the transparent display is employed to optically combine a corresponding portion of the synthetic light field with said portion of the real-world light field.

In a second aspect, the present disclosure provides a method comprising:

determining a relative position of each eye of at least one user with respect to a transparent display, using a tracker, wherein the transparent display is arranged on an optical path of a real-world light field from a real-world environment;

generating or retrieving an image to be displayed, based on the relative position of each eye of the at least one user with respect to the transparent display;

for a given region of the image that represents a graphical element, determining a corresponding portion of the transparent display from which light rays of the given region of the image are to be directed toward a given eye of the at least one user during display of the image, based on a relative position of the given eye with respect to the transparent display, and a position of the given region in the image;

capturing at least one real-world image of the real-world environment using at least one real-world facing camera;

determining a colour and luminance of a portion of the real-world light field that passes through the corresponding portion of the transparent display toward the given eye, based on the at least one real-world image and the relative position of the given eye with respect to the transparent display;

calculating a colour difference and a luminance difference for the given eye between the colour and luminance of said portion of the real-world light field and a colour and luminance of the graphical element;

adjusting at least one of: the colour, the luminance, a size, at least one iconographic parameter of the graphical element in the given region of the image, based on the colour difference and the luminance difference for the given eye; and displaying the image via the transparent display for producing a synthetic light field, wherein the transparent display is employed to optically combine a corresponding portion of the synthetic light field with said portion of the real-world light field.

The present disclosure provides the method and system for adaptive visibility enhancement in transparent augmented-reality displays. The system facilitates a contextual and eye-specific assessment of the background for each graphical element, enabling iconographic parameters to be selectively adjusted based on environmental visibility conditions. A technical benefit enabled is that the system enhances legibility of graphical elements for each eye of each user, even under variable lighting conditions and heterogeneous real-world backgrounds.

In certain implementations, the system is applicable to head-mounted augmented-reality displays, where graphical elements such as virtual annotations, task instructions, or user interface elements are required to be presented over physical environments without occlusion or distortion. The system is also suitable for augmented-reality displays implemented in windshields for vehicles, where graphical elements such as navigation prompts, hazard indicators, or environment-related data are presented to a user. Furthermore, the system is applicable in augmented-reality displays used in industrial maintenance or assembly environments for accurate overlays of graphical elements representing tools, components, or instructions, even when graphical element density is high. The system is also relevant to augmented-reality displays used in educational and retail contexts, where graphical elements are presented over physical exhibits or merchandise, enabling spatially aligned and context-aware visual augmentation without graphical interference. For example, in retail environments, the system is used in product displays where graphical elements such as price tags, promotional information, or comparative data are presented over items without overlapping or occluding real-world details. The system is also implementable in augmented-reality learning stations within classrooms or laboratories, where graphical elements representing anatomical structures, chemical diagrams, or historical reconstructions are presented over physical artifacts based on the relative position of each eye of the user.

The system evaluates the portion of the real-world light field that contributes to the perceived background of each graphical element from the perspective of each eye, in real-time using visual data captured through the transparent display while accounting for differences in background composition caused by the relative position of the eye, viewing direction, or a depth of the real-world environment. A technical benefit provided is that the system detects visibility mismatches for each graphical element as perceived separately by the left and right eyes of the at least one user, allowing accurate assessment of local contrast and colour similarity that would otherwise compromise visual clarity.

The system dynamically adjusts one or more iconographic parameters in response to the detected differences between the graphical element and the real-world light field. The adjustments are computed to maximize perceptual separation from the background while maintaining visual consistency across both eyes. Depending on the conditions, the system selectively modifies the luminance, colour, size, or iconographic parameter of the graphical element, ensuring that the adjustment remains appropriate to a functional relevance of the graphical element. A technical benefit enabled is that the graphical element remains distinguishable and interpretable without requiring static design constraints or prior knowledge of the background.

The system supports a consistent presentation of graphical elements across transparent display implementations where different portions of the transparent display are visible to each eye due to parallax. When the graphical element is positioned at a near optical depth, the system accounts for divergence that can result in eye-specific variability in the real-world light field. Adjustments to the graphical element are computed for achieving a perceptual compromise that is effective from perspectives of both eyes of the at least one user. An advantage facilitated is that the system reduces inconsistencies in stereoscopic presentation and avoids introducing depth distortion or visual discomfort.

The system is compatible with transparent displays that present a synthetic light field while allowing transmission of the real-world light field through the same optical path. The compatibility with the transparent display allows the graphical elements to coexist visually with the real-world environment without obstructing the field of view. A technical benefit provided is that the system maintains a persistent and unoccluded visual link to the real-world environment, making the system suitable for applications that require uninterrupted visual awareness, such as situational monitoring, spatial referencing, or real-time interaction.

In an exemplary implementation, the system processes graphical elements comprising directional cues or alerts to improve visibility when overlaid on high-luminance portions of the real-world light field, such as a sky or reflective surface. Adjustments to the colour or luminance of the graphical element are made to preserve contrast without exceeding emission limits of the transparent display. In another exemplary implementation, the graphical element comprises a symbolic indicator rendered near a centre of the transparent display, where user visual attention is typically concentrated. The system applies enhancement strategies that prioritise the centre of the transparent display by selectively increasing contrast or modifying iconographic parameters. An advantage provided is that perceptual salience of central graphical elements is maintained without distracting from the surrounding graphical content.

The present disclosure further provides the method for adaptive visibility enhancement in transparent augmented-reality displays. The method enables presentation of graphical elements toward the eyes of the at least one user by continuously adapting to visual differences between the graphical elements and a corresponding portion of the real-world light field. A technical benefit provided by the method is that perceptual clarity and spatial coherence of the graphical elements are maintained across varying user positions, lighting environments, and transparent display configurations, without relying on fixed visual parameters or static display conditions.

In an exemplary implementation, the method enables modification of the layout of flexible graphical elements, such as navigation aids or informational indicators, based on predicted visibility conflicts with real-world content located along the optical path. When a reduced contrast or problematic colour similarity is detected, the method comprises applying selective modifications such as partial fading of a less prominent graphical element or adjustment of iconographic parameters of a visually competing graphical element. The selection of the adjustment is guided by a calculation of perceptual differences between the graphical element and the background, providing an advantage of allowing the method to maintain visibility of prioritised graphical elements while preserving a consistent visual experience across both eyes of the at least one user.

Optionally, the at least one processor is configured to:

detect when the colour difference is below a predefined threshold colour difference; and when it is detected that the colour difference is below the predefined threshold colour difference, adjust the colour of the graphical element by changing it to a contrasting colour relative to the colour of said portion of the real-world light field.

The detection that the colour difference is below the predefined threshold colour difference enables the system to identify when the graphical element lacks sufficient chromatic separation from a corresponding portion of the real-world light field. In such scenarios, the colour of the graphical element may closely resemble the background, resulting in reduced perceptual salience and compromised visibility. The predefined threshold colour difference defines a minimum allowable chromatic distance between the graphical element and the background, below which the graphical element is considered to be visually indistinct.

When the colour difference falls below the predefined threshold colour difference, the colour of the graphical element is adjusted to increase perceptual separation from the corresponding portion of the real-world light field. The adjustment is performed by changing the colour of the graphical element to a contrasting colour relative to the background. The contrasting colour is selected to increase the chromatic disparity and restore interpretability, taking into account the colour of the real-world light field visible through the corresponding portion of the transparent display toward the given eye. A technical benefit enabled is that the graphical element remains visible and distinguishable even when the original colour closely matches the background, thereby preserving the legibility of the augmented content without relying on high-luminance adjustments alone.

Optionally, the at least one processor is configured to:

obtain information indicative of at least one pair of colours that is known to cause perceptual confusion for the at least one user due to colour blindness;

detect when the colour of said portion of the real-world light field and the colour of the graphical element form one of the at least one pair of colours; and when it is detected that the colour of said portion of the real-world light field and the colour of the graphical element form one of the at least one pair of colours, adjust the colour of the graphical element by changing it to another colour that, in combination with the colour of said portion of the real-world light field, does not form any of the at least one pair of colours.

The detection that the colour of the graphical element and the colour of the corresponding portion of the real-world light field form one of at least one pair of colours known to cause perceptual confusion enables the system to identify colour combinations that may be indistinguishable to the at least one user due to colour blindness. The term "pair of colours" that are known to cause perceptual confusion for the at least one user due to colour blindness can relate to a combination of colours such as red and green, blue and yellow, or red and black that are associated with reduced colour discrimination for users with specific types of colour vision deficiency.

The system obtains information indicative of at least one such pair of colours and uses the information to assess the visibility of the graphical element against the background. When it is detected that the graphical element and the corresponding portion of the real-world light field form one of the identified pairs of colours, the colour of the graphical element is adjusted to avoid the pairing of colours that can cause perceptual confusion for the at least one user. The adjustment is performed by changing the colour of the graphical element to another colour that, in combination with the background, does not match any of the identified pairs that cause perceptual confusion. A technical benefit enabled is that the graphical element remains perceptually accessible for the at least one user regardless of individual colour vision deficiencies, thereby improving visual inclusivity without requiring user-specific manual settings.

Optionally, the at least one processor is configured to:

detect when the luminance of said portion of the real-world light field is more than the luminance of the graphical element by more than a predefined threshold luminance difference; and when it is detected that the luminance of said portion of the real-world light field is more than the luminance of the graphical element by more than the predefined threshold luminance difference, perform at least one of:

adjusting the luminance of the graphical element by increasing it;

adjusting the size of the graphical element by increasing it;

adjusting the at least one iconographic parameter of the graphical element by performing at least one of: increasing a stroke weight of the graphical element, increasing an outline thickness of the graphical element, decreasing a number of features in the graphical element.

The detection that the luminance of the corresponding portion of the real-world light field exceeds the luminance of the graphical element by more than a predefined threshold luminance difference enables the system to identify scenarios in which the graphical element may be visually overpowered by the background. The term "predefined threshold luminance difference" as used throughout the present disclosure relates to a minimum luminance disparity beyond which the graphical element is considered to be at risk of loss of detail due to insufficient contrast relative to the real-world light field.

When it is detected that the luminance of the real-world background surpasses that of the graphical element by more than the predefined threshold luminance difference, the system may increase the luminance of the graphical element to enhance contrast, enlarge the size of the graphical element to improve detectability, or adjust at least one iconographic parameter to improve perceptual weight, so as to increase the visual prominence of the graphical element. The adjustment to the iconographic parameter may include increasing a stroke weight, thickening an outline, or reducing a number of visual features in the graphical element, thereby simplifying appearance of the graphical element for better visibility under high-luminance conditions. A technical benefit enabled is that the graphical element remains perceptible and functionally interpretable even when presented over bright or saturated portions of the real-world light field, without compromising spatial alignment or semantic role of the graphical element.

Optionally, the at least one processor is configured to:

for the given region of the image that represents the graphical element, determine another corresponding portion of the transparent display from which the light rays of the given region of the image are to be directed toward another eye of the at least one user during display of the image, based on a relative position of the another eye with respect to the transparent display, and the position of the given region in the image;

determine a colour and luminance of another portion of the real-world light field that passes through the another corresponding portion of the transparent display toward the another eye, based on the at least one real-world image and the relative position of the another eye with respect to the transparent display;

calculate a colour difference and a luminance difference for the another eye between the colour and luminance of the another portion of the real-world light field and the colour and luminance of the graphical element; and adjust at least one of: the colour, the luminance, the size, the at least one iconographic parameter of the graphical element in the given region of the image, based further on the colour difference and the luminance difference for the another eye, wherein the transparent display is employed to optically combine another corresponding portion of the synthetic light field with the another portion of the real-world light field.

The system determines the visibility condition for the graphical element from the perspective of each eye of the at least one user by evaluating the real-world light field separately for the given eye and for the another eye. The determination of the visibility condition allows the system to detect situations in which the graphical element is seen against differing backgrounds due to a geometry of the scene or a viewing angle of the at least one user. When a real-world object is located closer to the transparent display than the graphical element, the background as seen through a corresponding portion of the transparent display may vary between the eyes of the at least one user, even if the graphical element remains the same. The system performs an independent visibility assessment for the another eye of the at least one user to determine whether the colour and luminance of the graphical element remain visually distinguishable in both viewpoints.

The system modifies at least one graphical parameter of the graphical element based further on the calculated differences for the another eye. By modifying the at least one graphical parameter of the graphical element, the system accounts for interocular variation in background conditions that may affect perceptual clarity. The modification ensures that the graphical element remains legible and functionally interpretable regardless of which eye the graphical element is viewed from. A technical benefit enabled is that the system preserves binocular consistency of the graphical element across stereoscopic views, thereby maintaining depth stability and reducing perceptual conflict in the rendered content.

In certain exemplary implementations, the transparent display is a transparent autostereoscopic display that directs different portions of the synthetic light field to each eye of the at least one user. In such scenarios, the system supports viewpoint-specific visibility adaptation, allowing separate assessments and graphical modifications based on the background and content visible to each eye. The adaptation ensures that tailoring of the image does not interfere with the intentional multiscopic design of the transparent autostereoscopic display.

In another exemplary implementation, the transparent display is implemented as a waveguide display unit that projects the graphical element at optical infinity. In such scenarios, although the graphical element may appear similar across both eyes, nearby real-world content such as a dashboard element, a hand, or vegetation may differ in appearance between the eyes of the at least one user due to parallax. The system compensates for such background asymmetry by evaluating and adjusting the graphical element in response to eye-specific differences in the real-world light field. An advantage provided is that the graphical element remains stable and perceptually balanced even in scenes with asymmetric real-world backgrounds.

Optionally, the at least one processor is configured to:

detect when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, determine whether the given eye or the another eye is a dominant eye of the at least one user; and adjust the colour of the graphical element for both the given eye and the another eye, based on the colour difference and the luminance difference for the dominant eye.

The system detects an interocular difference in background colour by comparing the colour of the portion of the real-world light field visible through a corresponding portion of the transparent display toward the given eye with the colour of the another portion of the real-world light field visible through another corresponding portion of the transparent display toward the another eye. When the colours of the backgrounds differ, the graphical element may require different colour adjustments for each eye to maintain visibility. However, applying different colour adjustments for each eye may lead to inconsistencies in the graphical element across stereoscopic views, introducing perceptual artefacts or compromising depth interpretation.

To resolve such interocular adjustment conflicts, the system determines whether the given eye or the another eye is a dominant eye of the at least one user. The term "dominant eye" as used throughout the present disclosure relates to the eye that is functionally preferred by the visual system of the at least one user for tasks requiring precise alignment or focus. The identification of the dominant eye allows the system to prioritise visibility conditions that are perceptually more significant for the at least one user.

For example, when a conflict in colour adjustment is detected, the system resolves the conflict by adjusting the colour of the graphical element for both the given eye and the another eye based on the colour difference and the luminance difference associated with the dominant eye. The adjustment allows the graphical element to remain visually coherent across both eyes while maintaining higher perceptual clarity for the eye that contributes more prominently to the user's spatial interpretation. A technical benefit provided is that the system maintains a consistent and readable presentation of the graphical element even in cases of asymmetric background conditions, without introducing visual dissonance due to mismatched adjustments across the stereoscopic view.

Optionally, the at least one processor is configured to:

detect when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, determine a compromise colour for both the given eye and the another eye, based on the colour difference and the luminance difference for the given eye, and the colour difference and the luminance difference for the another eye; and adjust the colour of the graphical element by changing it to the compromise colour for both the given eye and the another eye.

The system identifies a conflict in the colour adjustment of the graphical element by detecting that the colour of the portion of the real-world light field visible to the given eye differs from the colour of the another portion of the real-world light field visible to the another eye. When the respective background conditions lead to different visibility requirements for each eye, and the required colour adjustment of the graphical element for one eye contradicts the adjustment required for the other eye, a presentation conflict is detected. Such a conflict in the colour adjustment may result in a disparity in appearance of the graphical element across the two viewpoints, potentially reducing binocular consistency and visual stability.

In response, the system determines the compromise colour that satisfies visibility requirements from both perspectives. The determination of the compromise colour is based on the colour difference and luminance difference calculated independently for the given eye and the another eye. The compromise colour is selected to avoid excessive reduction in contrast or interpretability from either viewpoint, thereby preserving an acceptable level of visual clarity across both eyes of the at least one user.

The system applies the compromise colour to the graphical element as seen from both the given eye and the another eye. A technical benefit enabled is that the system maintains perceptual coherence of the graphical element across stereoscopic views without relying on dominance detection, improving the stability of appearance when background conditions vary between the two eyes.

Optionally, the system further comprising a speaker, wherein the at least one processor is configured to:

detect when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, output a voice notification related to the graphical element via the speaker.

The system detects that the colour of the corresponding portion of the real-world light field differs from the colour of the another portion of the real-world light field and identifies that the adjustment in the colour of the graphical element for the given eye conflicts with the adjustment in the colour of the graphical element for the another eye. The detection of the conflict in the adjustment of the colour of the graphical element between the given eye and the another eye indicates a situation in which the graphical element cannot be visually rendered in a consistent manner for both eyes of the at least one user due to asymmetric background conditions. In such scenarios, neither the compromise colour nor a resolution based on the dominant eye may preserve the intended visibility or meaning of the graphical element for both eyes simultaneously.

In response to this condition, the system generates a voice notification related to the graphical element and outputs the voice notification via the speaker. The term "speaker" as used throughout the present disclosure relates to an electroacoustic transducer integrated with the system and configured to provide audible output in the form of synthesized or pre-recorded speech, tones, or alerts. The voice notification serves as an auxiliary modality for conveying the content or purpose of the graphical element to the at least one user in a perceptually accessible form when visual representation is degraded due to background asymmetry. A technical benefit provided is that the graphical element remains interpretable even under unresolved stereoscopic presentation conflicts, thereby improving reliability of the system under diverse viewing conditions.

Optionally, the system further comprising at least one real-world facing depth camera, wherein the at least one processor is configured to:

determine gaze directions of the eyes of the at least one user, using the tracker;

determine a focus depth at which the at least one user is gazing, based on the gaze directions of the eyes;

generate a depth map of the real-world environment using the at least one real-world facing depth camera;

determine an optical depth at which a real-world object is present, based on the depth map and the gaze directions of the eyes;

detect when a first difference between the focus depth and an optical depth at which the graphical element is being presented via the synthetic light field is smaller than a first predefined threshold difference, and when a second difference between the focus depth and the optical depth at which the real-world object is present is greater than a second predefined threshold difference; and when it is detected that the first difference is smaller than the first predefined threshold difference and the second difference is greater than the second predefined threshold difference, perform at least one of:

apply a defocus blur on the at least one real-world image of the real-world environment, before determining the colour and luminance of said portion of the real-world light field;

expand the corresponding portion of the transparent display used for determining the colour and luminance of said portion of the real-world light field.

The system determines gaze directions of the eyes of the at least one user using the tracker and calculates the focus depth at which the at least one user is gazing. The term "focus depth" as used throughout the present disclosure relates to the optical distance from the eyes of the at least one user to the point in the real-world environment where both gaze directions converge. To evaluate background visibility conditions at the focus depth, the system generates the depth map of the real-world environment using the at least one real-world facing depth camera. The term "real-world facing depth camera" refers to a depth-sensing camera configured to face the real-world environment and generate pixel-level depth information, for example using structured light, time-of-flight, or stereo-vision principles.

Using the depth map and the gaze directions, the system determines an optical depth at which a real-world object is present. The system then compares the determined optical depth with the focus depth and the optical depth at which the graphical element is being presented via the synthetic light field. If it is detected that the first difference, between the focus depth and the depth of the graphical element, is smaller than the first predefined threshold difference, and that the second difference, between the focus depth and the real-world object, is greater than the second predefined threshold difference, the system identifies a perceptual condition in which the user is focusing on the graphical element while a nearer real-world object may interfere with visibility.

In response, the system performs at least one of two adaptive operations. In one implementation, the system applies a defocus blur on the at least one real-world image of the real-world environment before determining the colour and luminance of the portion of the real-world light field. The defocus blur simulates the natural depth-of-field response of human vision and visually attenuates the influence of out-of-focus real-world objects that may interfere with contrast assessment. In another implementation, the system expands the corresponding portion of the transparent display used for determining the colour and luminance of said portion of the real-world light field. The expansion accommodates the angular variability of real-world backgrounds at near depths and provides a more representative sample of the visual input perceived through that region. A technical benefit enabled is that the visibility evaluation of the graphical element is made more robust to perceptual interference caused by nearby physical objects, improving background modelling accuracy for adaptive graphical adjustments.

Optionally, the at least one processor is configured to:

determine gaze directions of the eyes of the at least one user, using the tracker;

detect when the image represents a plurality of graphical elements; and when it is detected that the image represents the plurality of graphical elements, identify a graphical element from the plurality of graphical elements based on the gaze directions of the eyes; and perform the step of determining the corresponding portion of the transparent display, the step of determining the colour and luminance of the portion of the real-world light field, the step of calculating the colour difference and the luminance difference, and the step of adjusting, for the graphical element that is identified based on the gaze directions.

The system detects when the image represents the plurality of graphical elements, which may include a collection of visual components such as symbols, annotations, or user interface elements. Upon detecting that the image represents the plurality of graphical elements, the system identifies one graphical element from the plurality based on the gaze directions of the eyes of the at least one user.

The system then determines the corresponding portion of the transparent display through which the graphical element is viewed by the at least one user. The determination of the corresponding portion of the transparent display allows the system to assess the real-world light field visible through that portion of the transparent display and perform a colour and luminance analysis relative to the graphical element. A technical benefit provided is that the system ensures the graphical element remains visible and legible, even when the plurality of graphical elements are displayed simultaneously, by focusing on the specific element the user is attending to.

The system calculates the colour difference and luminance difference for the identified graphical element from the real-world light field, comparing the colour difference and the luminance difference against the ideal attributes of the graphical element. Based on the calculated colour and luminance differences, the system adjusts the colour, luminance, or other visual parameters of the graphical element to improve contrast of the graphical element and ensure that the graphical element stands out from the background. A technical benefit enabled is that the system allows for dynamic adjustments based on user attention, optimizing the visibility of the most relevant graphical element in the field of view of the at least one user without modifying the entire image.

Optionally, the at least one processor is configured to:

determine at least one of: a colour scheme, a colour temperature, of at least the portion of the real-world light field, based on the at least one real-world image;

determine a colour grading adjustment for the graphical element, based on the luminance of said portion of the real-world light field, and the at least one of: the colour scheme, the colour temperature, of at least the portion of the real-world light field; and adjust the colour of the graphical element by applying the colour grading adjustment.

The system determines at least one of the colour scheme or the colour temperature of at least the portion of the real-world light field by analysing the at least one real-world image. The term "colour scheme" as used throughout the present disclosure relates to the overall dominant colour composition or palette detected in the portion of the real-world light field, such as warm, cool, neutral, or mixed tones. The term "colour temperature" as used throughout the present disclosure refers to the spectral characteristic of the light observed in the real-world environment, typically measured in Kelvin, indicating whether the illumination appears bluish (cool) or yellowish (warm).

The system then determines the colour grading adjustment for the graphical element, based on the luminance of said portion of the real-world light field and the determined colour scheme or colour temperature. The colour grading adjustment relates to a modification that alters how the colour of the graphical element is perceived, without necessarily changing the underlying hue. Such colour grading adjustments may include shifts in contrast, saturation, tint, or tonal range, enabling perceptual alignment or distinction relative to the background.

The system applies the colour grading adjustment to the graphical element to adapt the appearance of the graphical element in accordance with the background illumination and chromatic characteristics. A technical benefit enabled is that the graphical element maintains visual coherence with the real-world environment under variable lighting and colour conditions, improving perceptual integration while preserving functional legibility.

The term "transparent display" as used throughout the present disclosure relates to a display surface that is arranged on an optical path of a real-world light field from a real-world environment and is configured to emit a synthetic light field such that the synthetic light field is optically combined with the real-world light field. The transparent display allows light from the environment behind the display to pass through while presenting graphical elements that appear superimposed on the real-world scene. In one exemplary implementation, the transparent display is implemented as a waveguide display unit comprising a display and a transparent waveguide optically coupled to the display, wherein the transparent waveguide is configured to guide the synthetic light field produced by the display along a propagation path within the transparent waveguide and to emit the synthetic light field along the optical path of the real-world light field.

The term "tracker" as used throughout the present disclosure relates to a component configured to detect and determine a relative position of each eye of at least one user with respect to the transparent display. The tracker may include one or more sensors or image-based detection systems and may operate in conjunction with face tracking or eye tracking subsystems to provide spatial data required for determining how graphical elements are to be directed toward each eye.

The term "real-world facing camera" as used throughout the present disclosure relates to a camera that is configured to capture at least one real-world image of the real-world environment as viewed through the transparent display. The captured image is used to determine the colour and luminance of the portion of the real-world light field that passes through the corresponding portion of the transparent display toward a given eye.

The term "processor" as used throughout the present disclosure relates to at least one processing unit that is configured to execute operations comprising generation or retrieval of an image to be displayed, calculation of a colour difference and a luminance difference, adjustment of graphical parameters, and control of image display via the transparent display. The processor performs these operations based on input received from the tracker and the at least one real-world facing camera, and determines visibility conditions for each graphical element from the perspective of each eye.

The present disclosure further relates to the method as described above. Various embodiments and variants disclosed above with respect to the system described in the first aspect, apply mutatis mutandis to the method in the second aspect.

Optionally, the method further comprising:

detecting when the colour difference is below a predefined threshold colour difference; and when it is detected that the colour difference is below the predefined threshold colour difference, adjusting the colour of the graphical element by changing it to a contrasting colour relative to the colour of said portion of the real-world light field.

The method enables automatic colour adjustment of the graphical element when it is detected that the colour difference between the graphical element and the corresponding portion of the real-world light field is below the predefined threshold colour difference. The colour adjustment involves changing the colour of the graphical element to the contrasting colour that increases visual separation from the background. A technical benefit provided is that the graphical element remains perceptually distinct even in scenarios where the original colour is insufficiently separated from the background, thereby improving legibility without relying on changes to brightness alone.

Optionally, the method further comprising:

obtaining information indicative of at least one pair of colours that is known to cause perceptual confusion for the at least one user due to colour blindness;

detecting when the colour of said portion of the real-world light field and the colour of the graphical element form one of the at least one pair of colours; and when it is detected that the colour of said portion of the real-world light field and the colour of the graphical element form one of the at least one pair of colours, adjusting the colour of the graphical element by changing it to another colour that, in combination with the colour of said portion of the real-world light field, does not form any of the at least one pair of colours.

The method accounts for colour vision deficiency by using information indicative of at least one pair of colours known to cause perceptual confusion for the at least one user due to colour blindness. When the colour of the graphical element and the colour of the corresponding portion of the real-world light field match one of the identified pairs, the method adjusts the colour of the graphical element to avoid perceptual ambiguity. A technical benefit provided is that the graphical element remains interpretable for users with colour vision deficiencies, without requiring user-specific manual modifications.

Optionally, the method further comprising:

detecting when the luminance of said portion of the real-world light field is more than the luminance of the graphical element by more than a predefined threshold luminance difference; and when it is detected that the luminance of said portion of the real-world light field is more than the luminance of the graphical element by more than the predefined threshold luminance difference, performing at least one of:

adjusting the luminance of the graphical element by increasing it;

adjusting the size of the graphical element by increasing it;

adjusting the at least one iconographic parameter of the graphical element by performing at least one of: increasing a stroke weight of the graphical element, increasing an outline thickness of the graphical element, decreasing a number of features in the graphical element.

The method detects when the luminance of the graphical element is significantly lower than that of the corresponding portion of the real-world light field. When the luminance difference exceeds the predefined threshold luminance difference, the method applies at least one graphical modification such as increasing the luminance or the size of the graphical element, or adjusting an iconographic parameter to improve visual salience. A technical benefit provided is that the graphical element remains perceptible even against high-luminance real-world backgrounds, enhancing visual accessibility without disrupting overall display consistency.

Optionally, the method further comprising:

for the given region of the image that represents the graphical element, determining another corresponding portion of the transparent display from which the light rays of the given region of the image are to be directed toward another eye of the at least one user during display of the image, based on a relative position of the another eye with respect to the transparent display, and the position of the given region in the image;

determining a colour and luminance of another portion of the real-world light field that passes through the another corresponding portion of the transparent display toward the another eye, based on the at least one real-world image and the relative position of the another eye with respect to the transparent display;

calculating a colour difference and a luminance difference for the another eye between the colour and luminance of the another portion of the real-world light field and the colour and luminance of the graphical element; and adjusting at least one of: the colour, the luminance, the size, the at least one iconographic parameter of the graphical element in the given region of the image, based further on the colour difference and the luminance difference for the another eye, wherein the transparent display is employed to optically combine another corresponding portion of the synthetic light field with the another portion of the real-world light field.

The method determines the visibility condition for the graphical element from the perspective of both the given eye and the another eye of the at least one user. The determination of the visibility condition for the graphical element is achieved by independently evaluating the colour and luminance of the respective portions of the real-world light field that are visible through the transparent display toward each eye. The method then calculates separate colour and luminance differences for each eye and modifies at least one graphical parameter of the graphical element based further on the results obtained for the another eye. A technical benefit provided is that the method maintains consistent visibility of the graphical element when each eye perceives a different background due to spatial scene geometry or parallax, such as, in implementations involving a transparent autostereoscopic display or a waveguide display unit with nearby real-world content.

Optionally, the method further comprising:

detecting when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, determining whether the given eye or the another eye is a dominant eye of the at least one user; and adjusting the colour of the graphical element for both the given eye and the another eye, based on the colour difference and the luminance difference for the dominant eye.

The method detects when the graphical element appears against different backgrounds for the two eyes of the at least one user and when the colour adjustment made for one eye is incompatible with the colour adjustment made for the another eye. In such scenarios, the method identifies whether the given eye or the another eye is the dominant eye of the at least one user and applies a unified adjustment to the graphical element based on the colour and luminance differences for the dominant eye. A technical benefit provided is that the perceptual clarity of the graphical element is prioritised for the dominant eye, reducing visual discomfort and reinforcing perceptual consistency in scenarios involving conflicting visibility conditions across eyes.

Optionally, the method further comprising:

detecting when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, determining a compromise colour for both the given eye and the another eye, based on the colour difference and the luminance difference for the given eye, and the colour difference and the luminance difference for the another eye; and adjusting the colour of the graphical element by changing it to the compromise colour for both the given eye and the another eye.

The method identifies when the graphical element is seen against visually different backgrounds for the given eye and the another eye of the at least one user, and when the colour adjustment that improves visibility for one eye may reduce clarity for the other. In response to the conflict in the colour adjustment, the method determines the compromise colour for both the given eye and the another eye by jointly evaluating the colour difference and the luminance difference calculated for each eye. The method then adjusts the colour of the graphical element by changing the colour to the compromise colour, thereby maintaining a consistent appearance across viewpoints. A technical benefit provided is that the graphical element remains simultaneously interpretable from both eyes, even under asymmetric visibility conditions, without privileging one viewpoint over the other.

Optionally, the method further comprising:

detecting when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, outputting a voice notification related to the graphical element via a speaker.

When the method detects that the colour adjustment of the graphical element for the given eye is incompatible with an adjustment required for the another eye, the method outputs the voice notification related to the graphical element via the speaker. The output of the voice notification supplements the visual presentation by conveying relevant information through an auditory modality, ensuring that the graphical element remains accessible even when a visual compromise is not viable. A technical benefit enabled is that the method supports multimodal accessibility in challenging visual environments, providing users with uninterrupted access to the underlying content of the graphical element.

Optionally, the method further comprising:

determining gaze directions of the eyes of the at least one user, using the tracker;

determining a focus depth at which the at least one user is gazing, based on the gaze directions of the eyes;

generating a depth map of the real-world environment using at least one real-world facing depth camera;

determining an optical depth at which a real-world object is present, based on the depth map and the gaze directions of the eyes;

detecting when a first difference between the focus depth and an optical depth at which the graphical element is being presented via the synthetic light field is smaller than a first predefined threshold difference, and when a second difference between the focus depth and the optical depth at which the real-world object is present is greater than a second predefined threshold difference; and when it is detected that the first difference is smaller than the first predefined threshold difference and the second difference is greater than the second predefined threshold difference, performing at least one of:

applying a defocus blur on the at least one real-world image of the real-world environment, before determining the colour and luminance of said portion of the real-world light field;

expanding the corresponding portion of the transparent display used for determining the colour and luminance of said portion of the real-world light field.

The method determines the focus depth at which the at least one user is gazing and compares the focus depth with an optical depth of the graphical element presented via the synthetic light field, and with the optical depth of a real-world object, based on the depth map generated using at least one real-world facing depth camera. When the graphical element is at a depth that closely matches the focus depth but the real-world object is at a significantly different optical depth, the method adjusts the region from which the colour and luminance of the real-world light field are evaluated. The adjustment in the region is achieved by either applying the defocus blur to the at least one real-world image of the real-world environment or by expanding the corresponding portion of the transparent display used in the evaluation. A technical benefit provided is that the method selectively reduces the influence of out-of-focus real-world regions during visual assessment of the graphical element, thereby enabling a more accurate and gaze-aligned contrast evaluation.

Optionally, the method further comprising:

determining gaze directions of the eyes of the at least one user, using the tracker;

detecting when the image represents a plurality of graphical elements; and when it is detected that the image represents the plurality of graphical elements, identifying a graphical element from the plurality of graphical elements based on the gaze directions of the eyes; and performing the determining of the corresponding portion of the transparent display, the determining of the colour and luminance of the portion of the real-world light field, the calculating of the colour difference and the luminance difference, and the adjusting, for the graphical element that is identified based on the gaze directions.

When the image represents the plurality of graphical elements, the method uses the gaze directions of the eyes of the at least one user to identify a specific graphical element that is being attended to. The method then performs the necessary visual contrast evaluation and graphical adjustment steps specifically for the identified graphical element. A technical benefit provided is that graphical elements are adapted selectively based on user attention, allowing for prioritised contrast enhancement without requiring modification of all graphical elements simultaneously.

Optionally, the method further comprising:

determining at least one of: a colour scheme, a colour temperature, of at least the portion of the real-world light field, based on the at least one real-world image;

determining a colour grading adjustment for the graphical element, based on the luminance of said portion of the real-world light field, and the at least one of: the colour scheme, the colour temperature, of at least the portion of the real-world light field; and adjusting the colour of the graphical element by applying the colour grading adjustment.

The method determines at least one of the colour scheme or the colour temperature of at least the portion of the real-world light field using the at least one real-world image. Based on the information along with the luminance of said portion of the real-world light field, the method derives the colour grading adjustment for the graphical element. The colour of the graphical element is then adjusted by applying the colour grading adjustment to maintain perceptual coherence with the real-world background. A technical benefit provided is that the graphical element integrates more naturally with the visual tone of the real-world scene while preserving sufficient visual separation for interpretability.

DETAILED DESCRIPTION OF THE DRAWINGS

Figure 1:
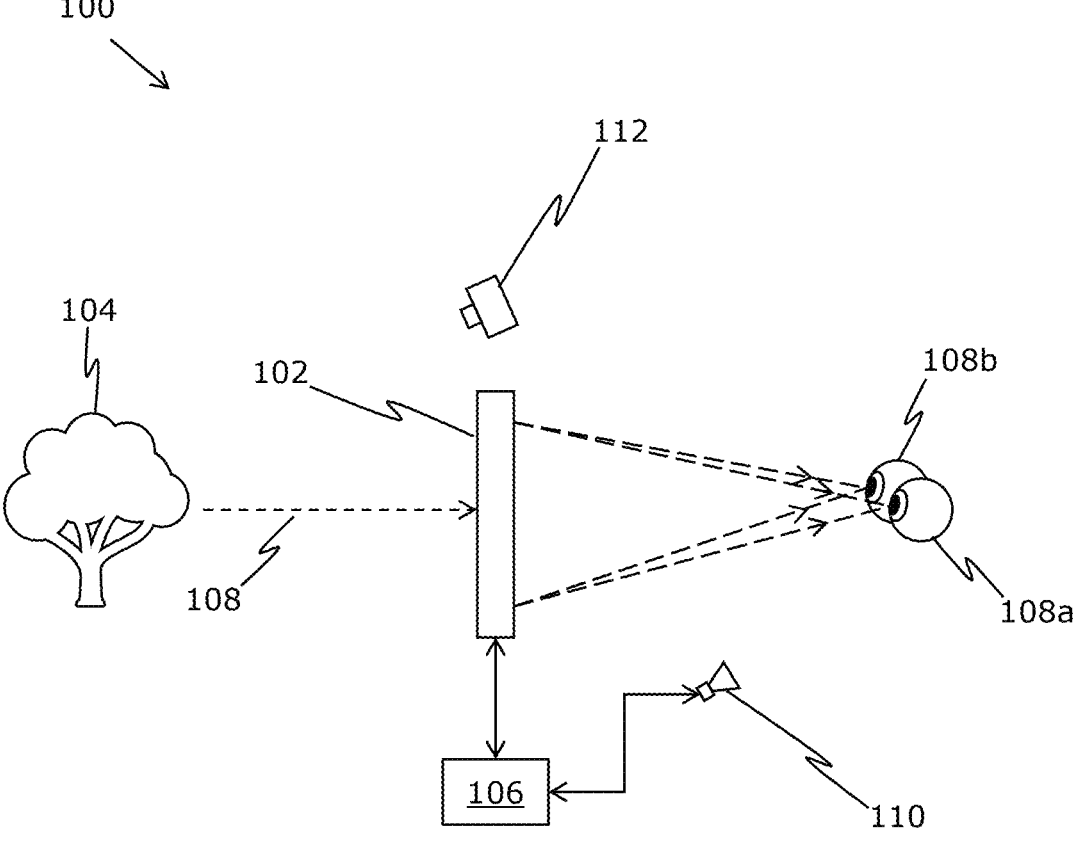
FIG. 1 shows an exemplary implementation of a system, in accordance with an embodiment of the present disclosure.

FIG. 1 shows an exemplary implementation of a system 100, in accordance with an embodiment of the present disclosure. The system 100 comprises a transparent display 102 configured to present at least one graphical element by optically combining a synthetic light field with a real-world light field. The transparent display 102 is positioned between a real-world environment 104 (represented using a tree) and at least one user, allowing the user to view virtual content overlaid onto the real-world environment 104.

The system 100 further comprises at least one processor 106 operatively connected to the transparent display 102 and configured to control presentation of the graphical element based on visibility conditions determined from the viewpoint of each of a left eye 108a and a right eye 108b of the user. The processor 106 uses input from a tracker 110, which is configured to detect the gaze directions and the relative positions of both eyes (108a, 108b) of the user with respect to the transparent display 102. The detected gaze directions enable the system 100 to compute the respective viewing directions for the graphical element from each eye of the left eye 108a and the right eye 108b the user.

The system 100 further comprises a real-world facing camera 112, which is positioned to capture at least one real-world image of the real-world environment 104. The captured image is used to evaluate visual characteristics of a background region lying behind the transparent display 102 from a perspective of the user. Such a background region is a portion of the real-world environment 104 that optically overlaps with the graphical element when viewed through the transparent display 102.

The processor 110 is configured to determine whether the graphical element is perceptually distinguishable against the background region, based on a comparison of colour and luminance derived from the real-world image captured by the real-world facing camera 112. For example, the background region may include a surface with brightness or colour similar to that of the graphical element, potentially reducing perceptual clarity. Such comparisons are performed separately for each the left eye 108a and the right eye 108b the user.

Based on the result of the visibility assessment, the processor 106 applies one or more graphical modifications to the graphical element to improve visibility thereof. The modifications may involve adjusting a colour, a luminance value, a size, or at least one iconographic parameter of the graphical element, such as a stroke weight or an outline thickness. The adjustments are applied in a way that preserves perceptual consistency across monocular and binocular viewpoints.

It will be understood that FIG. 1 provides a schematic illustration of the system 100 to support explanation of operation of the system 100. Additional components, such as real-world facing depth cameras, speakers, and the like may also be part of the system 100 depending on the implementation of the system 100.

Figure 2:
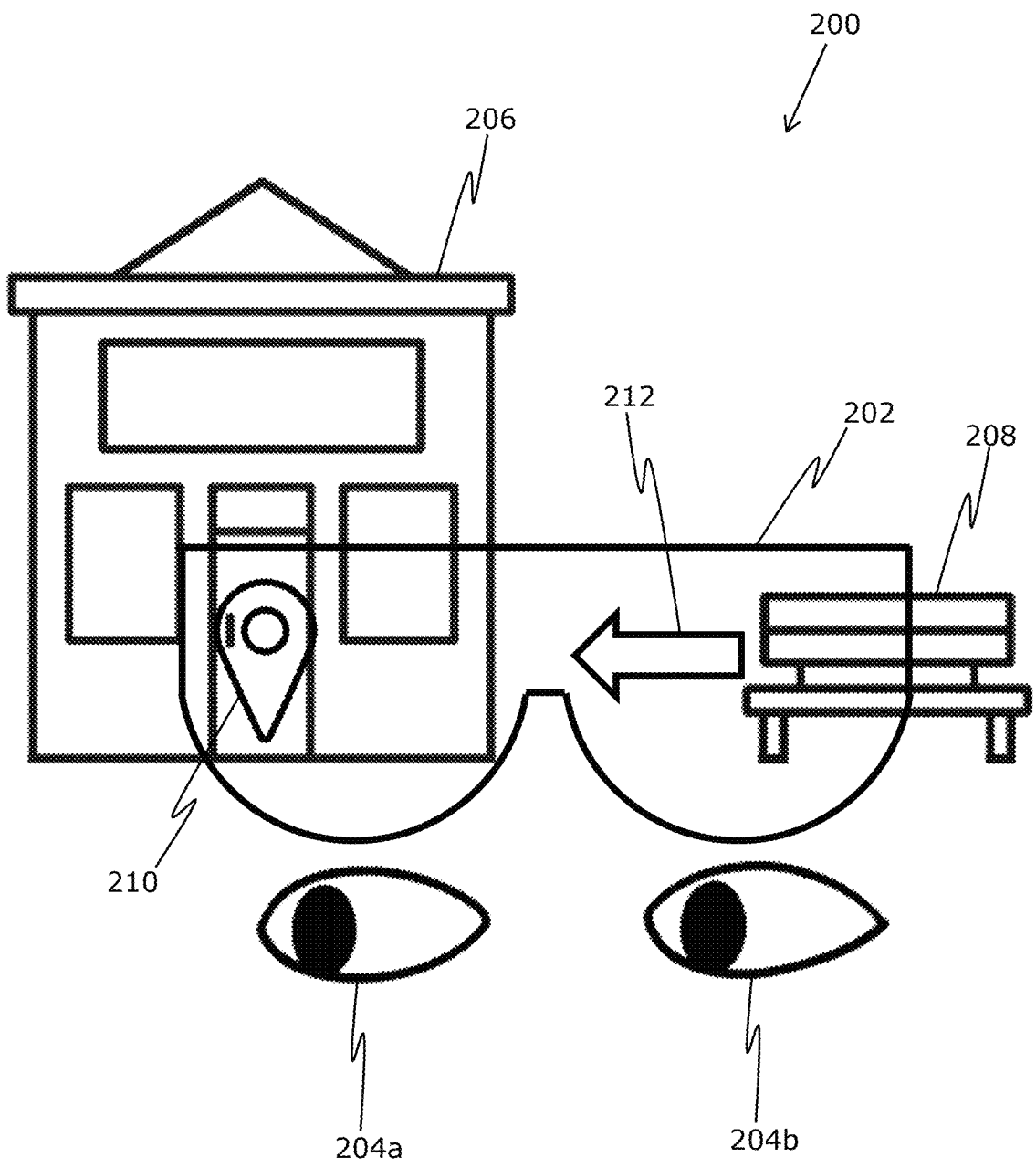
FIG. 2 shows an exemplary viewing scenario, in accordance with an embodiment of the present disclosure.

FIG. 2 shows an exemplary viewing scenario 200, in accordance with an embodiment of the present disclosure. A system (such as the system 100 shown in FIG. 1) is implemented within a head-mounted display (HMD) 202 worn by a user (not shown). The HMD 202 includes a transparent display (such as the transparent display 102 shown in FIG. 1), which is positioned in front of the eyes (204a, 204b) of the user, allowing the user to perceive synthetic content superimposed over a real-world environment. The real-world environment includes a building 206 and a bench 208 next to the building 206. The HMD 202 presents graphical elements (210, 212) that optically combines a synthetic light field with the real-world light field associated with the real-world environment, such that the graphical elements (210, 212) appear to be spatially aligned with real-world objects of the building 206 and the bench 208.

As shown, the graphical elements (210, 212) comprise the graphical element 210 representing a location marker is presented on the HMD 202 in a region visually overlapping with the building 206. Additionally, the graphical element 212 representing a left-direction arrow is presented in a spatially adjacent region and appears to point toward the building 206. The graphical element 210 is intended to indicate a point of interest, such as the building 206, while the graphical element 212 assists in guiding a gaze or attention of the user toward the building 206.

As the left eye 204a and the right eye 204b of the user are positioned behind the transparent display 102, while viewing both the real-world environment and the graphical elements (210, 212) presented by the system 100, a visual combination of the graphical element 210 with the portion of the real-world light field originating from the building 206 results in a scenario where the graphical element 210 becomes less perceptually distinguishable. Specifically, a colour and luminance of the portion of the real-world light field associated with the building 206 closely match those of the graphical element 210, thereby creating a condition where the graphical element 210 appears to blend with the background.

It will be understood that FIG. 2 presents a simplified scenario for the purpose of illustrating the operation of the system when synthetic graphical content is combined with a real-world background. Additional graphical elements, users, or background objects may also be included in other implementations, depending on the context in which the system is deployed.

Figure 3:
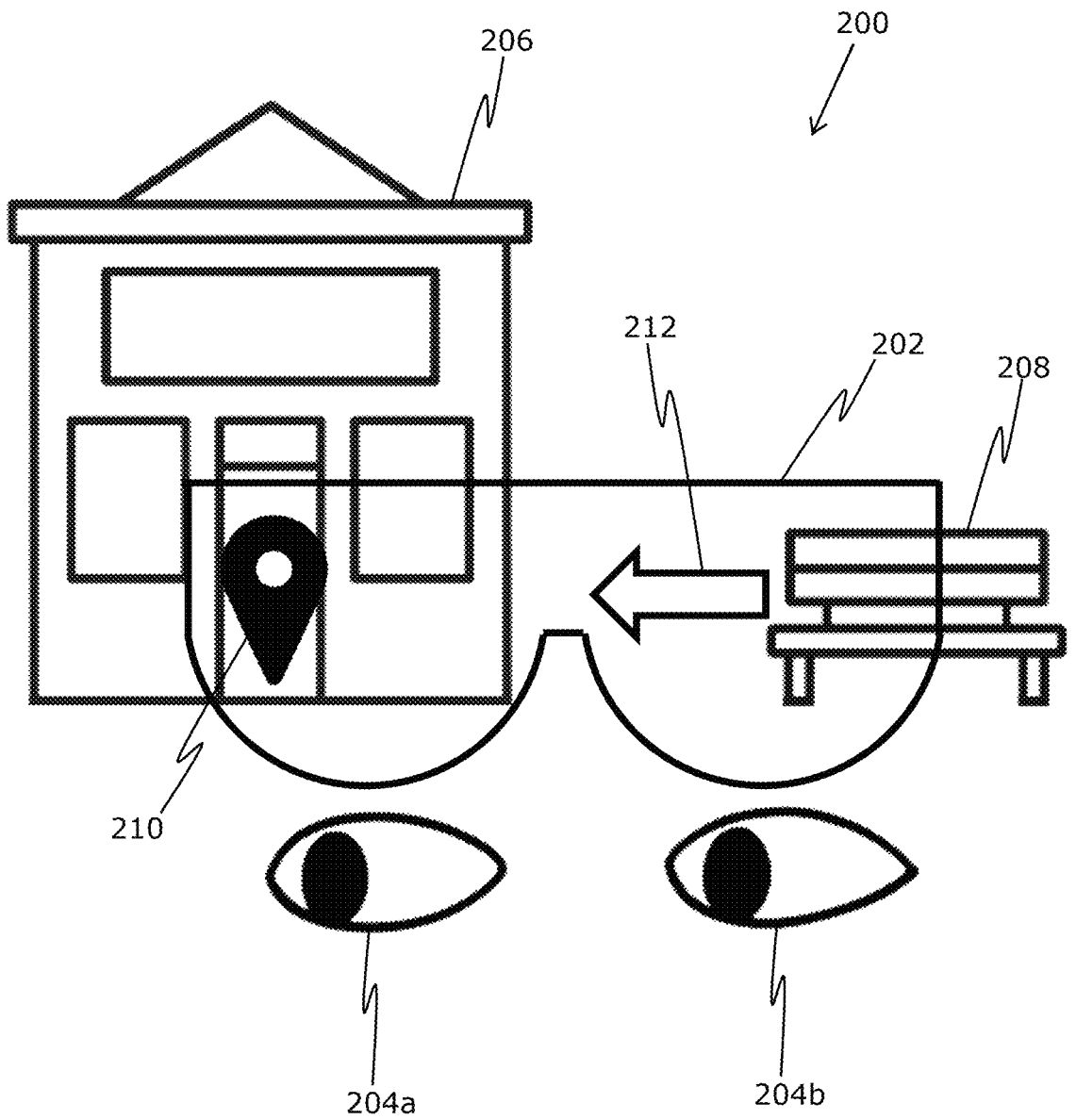
FIG. 3 shows a continuation of the representative viewing scenario shown in FIG. 2, in accordance with an embodiment of the present disclosure.

FIG. 3 shows a continuation of the representative viewing scenario 200 shown in FIG. 2, in accordance with an embodiment of the present disclosure. As shown, the system continues to present the graphical elements 210 and 212 on the HMD 202, while the user observes the building 206 and the bench 208 within the real-world environment. The left eye 204a and the right eye 204b of the user remain positioned behind the HMD 202, receiving a visual composition of both the real-world light field and the synthetic light field.

To improve visibility of the graphical element 210, at least one processor (such as the at least one processor 106 of the system 100 shown in FIG. 1) has adjusted the colour of the graphical element 210. In particular, the graphical element 210 has been changed from white to black, based on a comparison of the colour and luminance of the graphical element 210 with the portion of the real-world light field originating from the building 206. The change in the colour of the graphical element 210 enables to differentiate the graphical element 210 from the background of the building 206, improving perceptual clarity of the graphical element 210 without altering position or size thereof.

However, no adjustment has been made to the graphical element 212, which remains visually distinguishable from the portion of the real-world light field associated with the bench 208. As no significant colour or luminance similarity is detected between the graphical element 212 and the bench 208, the system retains the graphical element 212 without modification.

The scenario illustrated in FIG. 3 demonstrates how the system selectively applies visual adjustments to the graphical elements (210, 212) based on detected presentation conflicts with respective portions of the real-world light field, from the perspective of each eye (204a, 204b) of the user. The adjustments enable improved visibility of synthetic graphical content while maintaining visual consistency and alignment with real-world structures in the background, such as the building 206 and the bench 208.

It will be understood that FIG. 3 illustrates one example of adaptive presentation of graphical elements (210, 212) for a single user. Additional adjustments, such as luminance modification, size scaling, or iconographic parameter changes, may also be applied depending on the nature of the visibility conflict. Further, other graphical elements or environmental features may be processed similarly in other implementations of the system.

FIG. 4 shows steps of a method 400, in accordance with an embodiment of the present disclosure.

At step 402, a relative position of each eye of at least one user with respect to a transparent display is determined, using a tracker, wherein the transparent display is arranged on an optical path of a real-world light field from a real-world environment.

At step 404, an image to be displayed is generated or retrieved, based on the relative position of each eye of the at least one user with respect to the transparent display.

At step 406, for a given region of the image that represents a graphical element, a corresponding portion of the transparent display from which light rays of the given region of the image are to be directed toward a given eye of the at least one user during display of the image is determined, based on a relative position of the given eye with respect to the transparent display, and a position of the given region in the image.

At step 408, at least one real-world image of the real-world environment is captured using at least one real-world facing camera.

At step 410, a colour and luminance of a portion of the real-world light field that passes through the corresponding portion of the transparent display toward the given eye is determined, based on the at least one real-world image and the relative position of the given eye with respect to the transparent display.

At step 412, a colour difference and a luminance difference for the given eye between the colour and luminance of said portion of the real-world light field and a colour and luminance of the graphical element is calculated.

At step 414, at least one of: the colour, the luminance, a size, at least one iconographic parameter of the graphical element in the given region of the image is adjusted, based on the colour difference and the luminance difference for the given eye.

At step 416, the image is displayed via the transparent display for producing a synthetic light field, wherein the transparent display is employed to optically combine a corresponding portion of the synthetic light field with said portion of the real-world light field.

The aforementioned steps are only illustrative and other alternatives can also be provided where one or more steps are added, one or more steps are removed, or one or more steps are provided in a different sequence without departing from the scope of the claims herein.

The invention claimed is:

1. An augmented reality system comprising:
   a tracker;
   a transparent display arranged on an optical path of a real-world light field from a real-world environment;
   at least one real-world facing camera; and
   at least one processor configured to:
      determine a relative position of each eye of at least one user with respect to the transparent display, using the tracker;
      generate or retrieve an image to be displayed, based on the relative position of each eye of the at least one user with respect to the transparent display;
      for a given region of the image that represents a graphical element, determine a corresponding portion of the transparent display from which light rays of the given region of the image are to be directed toward a given eye of the at least one user during display of the image, based on a relative position of the given eye with respect to the transparent display, and a position of the given region in the image;

capture at least one real-world image of the real-world environment using the at least one real-world facing camera;

determine a colour and luminance of a portion of the real-world light field that passes through the corresponding portion of the transparent display toward the given eye, based on the at least one real-world image and the relative position of the given eye with respect to the transparent display;

calculate a colour difference and a luminance difference for the given eye between the colour and luminance of said portion of the real-world light field and a colour and luminance of the graphical element;

adjust at least one of: the colour, the luminance, a size, at least one iconographic parameter of the graphical element in the given region of the image, based on the colour difference and the luminance difference for the given eye; and display the image via the transparent display for producing a synthetic light field, wherein the transparent display is employed to optically combine a corresponding portion of the synthetic light field with said portion of the real-world light field.

2. The augmented reality system of claim 1, wherein the at least one processor is configured to:

detect when the colour difference is below a predefined threshold colour difference; and when it is detected that the colour difference is below the predefined threshold colour difference, adjust the colour of the graphical element by changing it to a contrasting colour relative to the colour of said portion of the real-world light field.

3. The augmented reality system of claim 1, wherein the at least one processor is configured to:

obtain information indicative of at least one pair of colours that is known to cause perceptual confusion for the at least one user due to colour blindness;

detect when the colour of said portion of the real-world light field and the colour of the graphical element form one of the at least one pair of colours; and when it is detected that the colour of said portion of the real-world light field and the colour of the graphical element form one of the at least one pair of colours, adjust the colour of the graphical element by changing it to another colour that, in combination with the colour of said portion of the real-world light field, does not form any of the at least one pair of colours.

4. The augmented reality system of claim 1, wherein the at least one processor is configured to:

detect when the luminance of said portion of the real-world light field is more than the luminance of the graphical element by more than a predefined threshold luminance difference; and when it is detected that the luminance of said portion of the real-world light field is more than the luminance of the graphical element by more than the predefined threshold luminance difference, perform at least one of:

adjusting the luminance of the graphical element by increasing it;

adjusting the size of the graphical element by increasing it;

adjusting the at least one iconographic parameter of the graphical element by performing at least one of: increasing a stroke weight of the graphical element, increasing an outline thickness of the graphical element, decreasing a number of features in the graphical element.

5. The augment reality system of claim 1, wherein the at least one processor is configured to:

for the given region of the image that represents the graphical element, determine another corresponding portion of the transparent display from which the light rays of the given region of the image are to be directed toward another eye of the at least one user during display of the image, based on a relative position of the another eye with respect to the transparent display, and the position of the given region in the image;

determine a colour and luminance of another portion of the real-world light field that passes through the another corresponding portion of the transparent display toward the another eye, based on the at least one real-world image and the relative position of the another eye with respect to the transparent display;

calculate a colour difference and a luminance difference for the another eye between the colour and luminance of the another portion of the real-world light field and the colour and luminance of the graphical element; and adjust at least one of: the colour, the luminance, the size, the at least one iconographic parameter of the graphical element in the given region of the image, based further on the colour difference and the luminance difference for the another eye, wherein the transparent display is employed to optically combine another corresponding portion of the synthetic light field with the another portion of the real-world light field.

6. The augmented reality system of claim 5, wherein the at least one processor is configured to:

detect when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, determine whether the given eye or the another eye is a dominant eye of the at least one user; and adjust the colour of the graphical element for both the given eye and the another eye, based on the colour difference and the luminance difference for the dominant eye.

7. The augmented reality system of claim 5, wherein the at least one processor is configured to:

detect when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, determine a compromise colour for both the given eye and the another eye, based on the colour difference and the luminance difference for the given eye, and the colour difference and the luminance difference for the another eye; and adjust the colour of the graphical element by changing it to the compromise colour for both the given eye and the another eye.

8. The augmented reality system of claim 5, further comprising a speaker, wherein the at least one processor is configured to:

detect when the colour of said portion of the real-world light field differs from the colour of the another portion of the real-world light field, and when an adjustment in the colour of the graphical element for the given eye conflicts with an adjustment in the colour of the graphical element for the another eye; and when it is detected that the colour of said portion of the real-world light field differs from the colour of the another portion of the real-world light field, and that the adjustment in the colour of the graphical element for the given eye conflicts with the adjustment in the colour of the graphical element for the another eye, output a voice notification related to the graphical element via the speaker.

9. The augmented reality system of claim 1, further comprising at least one real-world facing depth camera, wherein the at least one processor is configured to:

determine gaze directions of the eyes of the at least one user, using the tracker;

determine a focus depth at which the at least one user is gazing, based on the gaze directions of the eyes;

generate a depth map of the real-world environment using the at least one real-world facing depth camera;

determine an optical depth at which a real-world object is present, based on the depth map and the gaze directions of the eyes;

detect when a first difference between the focus depth and an optical depth at which the graphical element is being presented via the synthetic light field is smaller than a first predefined threshold difference, and when a second difference between the focus depth and the optical depth at which the real-world object is present is greater than a second predefined threshold difference; and when it is detected that the first difference is smaller than the first predefined threshold difference and the second difference is greater than the second predefined threshold difference, perform at least one of:

apply a defocus blur on the at least one real-world image of the real-world environment, before determining the colour and luminance of said portion of the real-world light field;

expand the corresponding portion of the transparent display used for determining the colour and luminance of said portion of the real-world light field.

10. The augmented reality system of claim 1, wherein the at least one processor is configured to:

determine gaze directions of the eyes of the at least one user, using the tracker;

detect when the image represents a plurality of graphical elements; and when it is detected that the image represents the plurality of graphical elements, identify a graphical element from the plurality of graphical elements based on the gaze directions of the eyes; and perform the step of determining the corresponding portion of the transparent display, the step of determining the colour and luminance of the portion of the real-world light field, the step of calculating the colour difference and the luminance difference, and the step of adjusting, for the graphical element that is identified based on the gaze directions.

11. The augmented reality system of claim 1, wherein the at least one processor is configured to:

determine at least one of: a colour scheme, a colour temperature, of at least the portion of the real-world light field, based on the at least one real-world image;

determine a colour grading adjustment for the graphical element, based on the luminance of said portion of the real-world light field, and the at least one of: the colour scheme, the colour temperature, of at least the portion of the real-world light field; and adjust the colour of the graphical element by applying the colour grading adjustment.

12. A method comprising:

determining a relative position of each eye of at least one user with respect to a transparent display, using a tracker, wherein the transparent display is arranged on an optical path of a real-world light field from a real-world environment;

generating or retrieving an image to be displayed, based on the relative position of each eye of the at least one user with respect to the transparent display;

for a given region of the image that represents a graphical element, determining a corresponding portion of the transparent display from which light rays of the given region of the image are to be directed toward a given eye of the at least one user during display of the image, based on a relative position of the given eye with respect to the transparent display, and a position of the given region in the image;

capturing at least one real-world image of the real-world environment using at least one real-world facing camera;

determining a colour and luminance of a portion of the real-world light field that passes through the corresponding portion of the transparent display toward the given eye, based on the at least one real-world image and the relative position of the given eye with respect to the transparent display;

calculating a colour difference and a luminance difference for the given eye between the colour and luminance of said portion of the real-world light field and a colour and luminance of the graphical element;

adjusting at least one of: the colour, the luminance, a size, at least one iconographic parameter of the graphical element in the given region of the image, based on the colour difference and the luminance difference for the given eye; and displaying the image via the transparent display for producing a synthetic light field, wherein the transparent display is employed to optically combine a corresponding portion of the synthetic light field with said portion of the real-world light field.

13. The method of claim 12, further comprising:

obtaining information indicative of at least one pair of colours that is known to cause perceptual confusion for the at least one user due to colour blindness;

detecting when the colour of said portion of the real-world light field and the colour of the graphical element form one of the at least one pair of colours; and when it is detected that the colour of said portion of the real-world light field and the colour of the graphical element form one of the at least one pair of colours, adjusting the colour of the graphical element by chang-
ing it to another colour that, in combination with the
colour of said portion of the real-world light field, does
not form any of the at least one pair of colours.

14. The method of claim 12, further comprising:

for the given region of the image that represents the
graphical element, determining another corresponding
portion of the transparent display from which the light
rays of the given region of the image are to be directed
toward another eye of the at least one user during
display of the image, based on a relative position of the
another eye with respect to the transparent display, and
the position of the given region in the image;

determining a colour and luminance of another portion of
the real-world light field that passes through the another
corresponding portion of the transparent display toward
the another eye, based on the at least one real-world
image and the relative position of the another eye with
respect to the transparent display;

calculating a colour difference and a luminance difference
for the another eye between the colour and luminance
of the another portion of the real-world light field and
the colour and luminance of the graphical element; and adjusting at least one of: the colour, the luminance, the
size, the at least one iconographic parameter of the
graphical element in the given region of the image, based further on the colour difference and the lumi-
nance difference for the another eye, wherein the transparent display is employed to optically
combine another corresponding portion of the synthetic light
field with the another portion of the real-world light field.

15. The method of claim 14, further comprising:

detecting when the colour of said portion of the real-world
light field differs from the colour of the another portion
of the real-world light field, and when an adjustment in
the colour of the graphical element for the given eye
conflicts with an adjustment in the colour of the graphi-
cal element for the another eye; and when it is detected that the colour of said portion of the
real-world light field differs from the colour of the
another portion of the real-world light field, and that the
adjustment in the colour of the graphical element for
the given eye conflicts with the adjustment in the colour
of the graphical element for the another eye, determining whether the given eye or the another eye is
a dominant eye of the at least one user; and adjusting the colour of the graphical element for both
the given eye and the another eye, based on the
colour difference and the luminance difference for
the dominant eye.

\*　\*　\*　\*　\*